Figure 1:
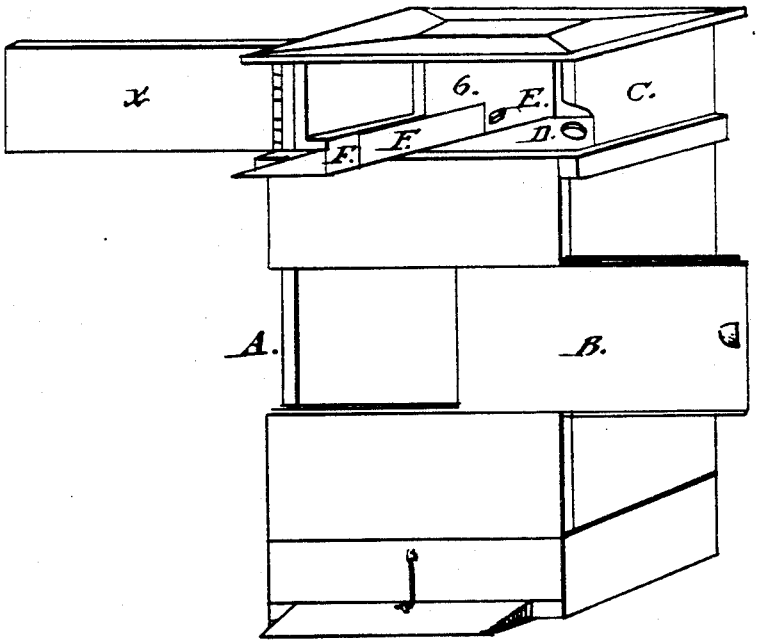
Figure 2:
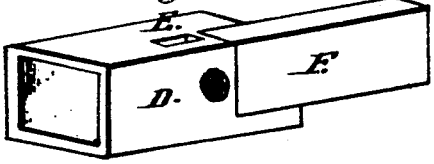

W. M. Hall;

BEST AVAILABLE COPY

Bee Hive.

No. 39. (A.1.) Patented Mar: 29. 1841.

N. PETERS, PHOTO-LITHOGRAPHER, WASHINGTON, D. C.